United States Patent
Korlepara

(10) Patent No.: US 8,099,484 B2
(45) Date of Patent: Jan. 17, 2012

(54) USING MOBILE AGENTS TO PERFORM OPERATIONS OF AN INFORMATION LIFE-CYCLE MANAGEMENT SYSTEM

(75) Inventor: Pavan Kumar Korlepara, Hyderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 555 days.

(21) Appl. No.: 11/426,605

(22) Filed: Jun. 27, 2006

(65) Prior Publication Data
US 2007/0299948 A1    Dec. 27, 2007

(51) Int. Cl.
*G06F 15/16* (2006.01)
(52) U.S. Cl. .................. 709/223; 709/226
(58) Field of Classification Search ............ 709/223, 709/200–203, 217–222, 226
See application file for complete search history.

(56) References Cited

U.S. PATENT DOCUMENTS

| | | | |
|---|---|---|---|
| 7,472,381 B2 * | 12/2008 | Fox et al. ............ | 717/148 |
| 7,614,059 B2 * | 11/2009 | Manzano ............ | 719/315 |
| 2003/0046396 A1 * | 3/2003 | Richter et al. ........ | 709/226 |
| 2007/0130236 A1 * | 6/2007 | Seeger et al. ........ | 707/205 |
| 2007/0226438 A1 * | 9/2007 | Erofeev ............ | 711/162 |
| 2008/0183797 A1 * | 7/2008 | Cho et al. ............ | 709/201 |

OTHER PUBLICATIONS

Milojicic, D., et al., Trend Wars, "*Mobile agent applications*", IEEE Concurrency, pp. 80-90, Jul.-Sep. 1999.
BrightStor Recovery Management, "*Providing Continual Access to Crucial Information*", Computer Associates International, Inc., www.ca.com/brightstor, 8 pages, Printed Apr. 2006.

* cited by examiner

*Primary Examiner* — Moustafa M Meky
(74) *Attorney, Agent, or Firm* — Baker Botts L.L.P.

(57) ABSTRACT

Facilitating performance of an operation in an information life-cycle management system comprising management elements organized levels includes generating a mobile agent operable to perform the operation. The mobile agent is embodied in executable code and is operable to move through at least a portion of the information life-cycle management system. The operation is performed using the mobile agent.

20 Claims, 5 Drawing Sheets

US 8,099,484 B2

USING MOBILE AGENTS TO PERFORM OPERATIONS OF AN INFORMATION LIFE-CYCLE MANAGEMENT SYSTEM

TECHNICAL FIELD

This invention relates generally to the field of storage systems and more specifically to using mobile agents to perform operations of an information life-cycle management system.

BACKGROUND

Data may be stored in a storage system that includes a variety of storage devices. Certain types of data may be more efficiently stored on particular types of storage devices. Accordingly, storage and movement of data to the appropriate devices may be managed to promote efficiency.

Information Life-cycle Management (ILM) may be used to manage storage and movement of data. Known ILM techniques involve storing data at different levels of a storage system and transferring data from one level to another level according to storage policies. These known techniques, however, could be more effective in certain situations.

SUMMARY OF THE DISCLOSURE

In accordance with the present invention, disadvantages and problems associated with previous techniques for storing data may be reduced or eliminated.

According to one embodiment of the present invention, facilitating performance of an operation in an information life-cycle management system comprising management elements organized levels includes generating a mobile agent operable to perform the operation. The mobile agent is embodied in executable code and is operable to move through at least a portion of the information life-cycle management system. The operation is performed using the mobile agent.

Certain embodiments of the invention may provide one or more technical advantages. A technical advantage of one embodiment may be that mobile agents may perform operations of an Information Life-cycle Management (ILM) system. The mobile agents may more efficiently perform the operations.

Another technical advantage of one embodiment may be that mobile agents may be used to discover management elements of an ILM system. Another technical advantage of one embodiment may be that mobile agents may be used to update storage policies of an ILM system. Another technical advantage of one embodiment may be that mobile agents may be used to move storage objects in an ILM system.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
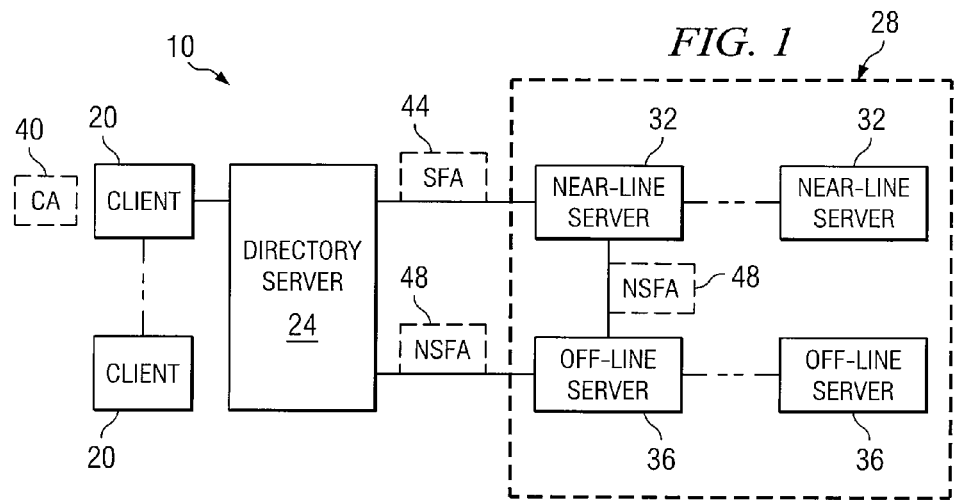
FIG. 1 is a block diagram illustrating one embodiment of a system that facilitates Information Life-cycle Management (ILM)
Figure 2:
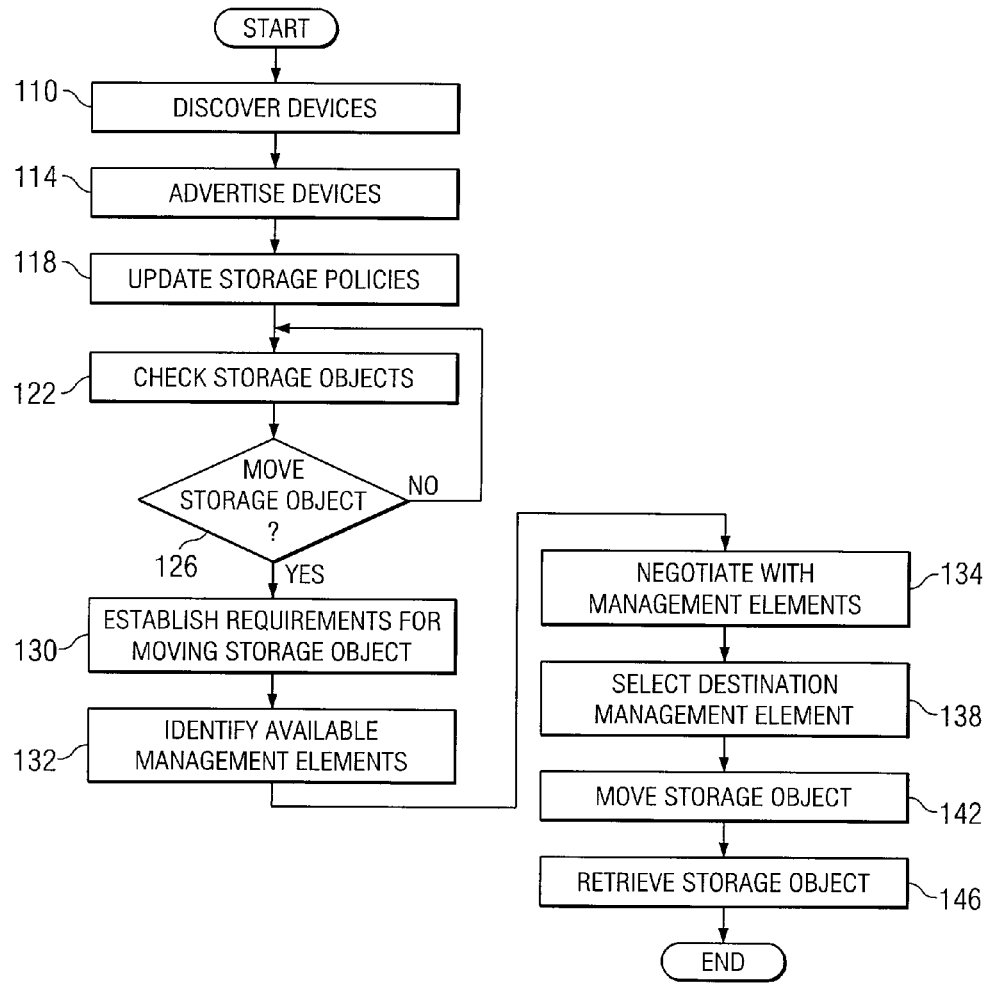
FIG. 2 is a flowchart illustrating one embodiment of a method for facilitating Information Life-cycle Management.

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system 10 that facilitates Information Life-cycle Management (ILM). According to the embodiment, system 10 may use agents, such as mobile agents, to perform certain operations of system 10. As an example, agents may be used for information storage and retrieval, policy management, discovery of managed/management devices, other suitable tasks, or any combination of the preceding.

Information Life-cycle Management involves storing data at different levels of a storage system and transferring data from one level to another level according to storage policies. According to one embodiment, a level may represent a type of management element. A management element may refer to storage media operable to store data. A type of management element may be defined by one or more suitable features of management elements. Example features include the speed of the management element, bandwidth provided by the management element, reliability of the management element, redundancy of the management element, accessibility of the information stored by the management element, cost to use the management element, resources used by the management element, other suitable feature, or any combination of any of the preceding. In an example, a first level may represent faster, but more expensive storage media, and a second level may represent slower, yet less expensive storage media.

A storage policy may specify the level at which data of a particular value are stored. The value of data may be specified according to one or more suitable data characteristics. Example data characteristics include the priority of the data, amount that the data is accessed, age of the data, other suitable feature, or any combination of any of the preceding. As an example, more valuable data may be designated as data that is newer, is accessed more frequently, has other suitable characteristic, or any combination of the preceding. A storage policy may specify that more valuable data may be stored at a first level representing faster, more expensive storage media, and less valuable data may be stored at the second level representing slower, less expensive storage media. A storage policy may be a default policy set for a particular level of management elements, or may be a policy configured for one or more management elements.

A storage policy may specify any suitable storage parameters. As an example, a policy parameter may specify that information is to be moved from one level of storage to another level of storage after a specific time period.

System 10 represents any suitable system that facilitates Information Life-cycle Management. System 10 includes components such as devices. In general, a device may include any suitable arrangement of components operable to perform the operations of the device. As an example, one or more components of system 10 may include logic, an interface, memory, other component, or any suitable combination of the preceding.

"Logic" may refer to hardware, software, other logic, or any suitable combination of the preceding that may be used to process information according to instructions. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes one or more clients 20, a directory server 24, and servers 28 comprising one or more near-line servers 32 and one or more off-line servers 36 coupled as shown. According to the illustrated embodiment, clients 20 and servers 28 may operate as management elements. System 10 also includes agents such as a client agent (CA) 40, a store file agent (SFA) 44, and a near-line store file agent (NSFA) 48.

A client 20 represents a computer system that accesses a service of a server through system 10. Directory server 24 represents a server that manages system 10. According to one embodiment, directory server 24 may manage the operations of and the information used by system 10. According to the embodiment, directory server 24 may discover management elements configured as servers 28, gather management element descriptions, and store the descriptions persistently in a database. Directory server 24 may also update storage policies.

System 10 may include any suitable number of levels of management elements embodied as clients 20, servers 28, or both. As an example, system 10 may include two or three levels of servers. According to the illustrated embodiment, servers 28 include two levels of servers, a near-line server 32 and an off-line server 36. According to one embodiment, data may be stored as storage objects.

According to one embodiment, system 10 may use agents 40, 44, and 48, such as mobile agents, to perform certain operations of system 10. An agent may refer to a process, which may be embodied in software such as executable code. As an example, agents may be used for information storage and retrieval, policy management, discovery of managed/management devices, other suitable tasks, or any combination of the preceding.

A mobile agent may refer to an agent that can travel across a network and perform tasks on devices that provide agent hosting capability. A mobile agent may travel and interact with devices such as databases, file systems, information services, other agents, other entities, or any suitable combination of any of the preceding. Mobile agents allow processes to migrate from device to device, to split into multiple instances that execute on different devices, and to return to their point of origin. Mobile agents do not remain bound to a particular device. Any suitable mobile agent architecture may be used. For example, IBM Aglets implemented in JAVA may be used.

Mobile agents may perform any suitable operations of system 10. Example mobile agents include a negotiation agent, a discovery agent, an advertising agent, a policy agent, a policy check agent, an information movement agent, and an information retrieval agent.

A negotiation agent may refer to an agent generated by a management element to negotiate on the behalf of the management element. The negotiation agent may include information regarding the management element, for example, the SLAs offered at the management element, reliability/redundancy levels of the management element, storage space of the management element, other feature of the management element, or any combination of the preceding. Management elements may park negotiation agents on directory server 24 in order to negotiate with other negotiation agents. Negotiation agents may register with directory server 24 to notify directory server 24 of their availability for negotiation.

A discovery agent may refer to an agent that discovers devices of system 10 and then reports information about the devices to directory server 24. According to one embodiment, directory server 24 may generate discovery agents that travel from device to device through system 10, retrieve information regarding the devices, and report the information to directory server 24.

Devices may include clients 20 and management elements configured as servers 28. Example management element information may include the current operational state of the management element, address (for example, the IP address) of the management element, credentials of the management element, other suitable information describing the management element, or any suitable combination of the preceding. Directory server 24 may create a topology of the management elements from the descriptions, so the management elements need not be aware of the location or state of the other management elements.

An advertising agent may refer to an agent that is sent to directory server 24 by a device to update the information for the device. The device may send an advertising agent at any suitable time, for example, in response to receiving a discovery agent or during initialization of the device.

A policy agent may refer to an agent that is used to update storage policies. A policy may be updated at any suitable time, for example, during start up or during discovery of management elements. Policy agents may include policy management agents and policy management client agents. Directory server 24 may generate a policy management agent to send to a management element to update the policies of the management element. The policy management agent may forcibly update participating management elements.

A management element may generate a policy management client agent to request a policy update. The policy management client agent may be sent to directory server 24 and negotiate feasibility aspects. The policies may be updated in accordance with the negotiation.

A policy check agent may refer to an agent that is run at a management element to establish if storage objects stored at the management element should be moved. Storage objects may be designated to be moved in any suitable manner. In one case, a storage object with a parameter that satisfies a threshold of a policy rule for moving storage objects may be designated to be moved. Thresholds may include, for example, the time of last creation, file type, time of last access, time of last modification, other threshold, or any combination of the preceding.

An information movement agent may refer to an agent that manages movement of a storage object to a selected destination management element. According to one embodiment, the information movement agent may determine the requirements for moving the storage object, establish the available management elements, negotiate to select a destination management element in accordance with the requirements, and initiate movement of the storage object to the selected destination management element. A policy check agent may generate the information movement agent.

According to the embodiment, the information movement agent may determine the requirements for moving the storage object in any suitable manner. For example, the information movement agent may determine the credentials of the storage object, storage space required, other information for establishing the requirements for moving the storage object, or any combination of the preceding.

The information movement agent may establish the available management elements in any suitable manner. For example, the information movement agent may travel to directory server 24 to establish the available management elements. The information movement agent may request a list of the management elements on the next level as established by a storage policy.

The information movement agent may negotiate to select a destination management element in any suitable manner. For example, the information movement agent negotiates with negotiation agents of the available management elements through a mobile agent inter-agent communication mechanism. The information movement agent may negotiate to identify management elements that can satisfy the requirements of moving the storage object in a satisfactory manner.

The information movement agent may initiate movement of the storage object to the selected destination management element in any suitable manner. For example, the information movement agent may travel to the selected destination management element and request the storage object from the policy check agent of the source management element. The storage object may be sent to the destination management element over a TCP/IP connection. The policy check agent may update a catalog at the source management element to indicate that the storage object has been moved, and the catalog at the destination management element may be updated to indicate that the storage object has been moved.

An information retrieval agent manages retrieval of a storage object from a management element. According to one embodiment, a storage object may be retrieved in response to a request from a device of system 10. In certain cases, management elements may have information about storage objects moved according to a storage policy, but not about the current location of the storage objects. In these cases, the information retrieval agent may track down the storage object.

According to the embodiment, the information retrieval agent retrieves information about the storage object (for example, name, credentials, other information, or any combination of the preceding) from a source management element. The information retrieval agent travels to directory server 24 and requests a list of the management elements of the next level. The information retrieval agent then travels to the management elements of the next level to find a management element with information about the storage object. The information may indicate movement of the storage object to the next level. Again, the information retrieval agent travels to directory server 24 to request a list of the management elements at the next level, and so on, until the agent locates the storage object. When the storage object is located, the information retrieval agent contacts a corresponding agent at the source management element, and sends the storage object over a link such as a TCP/IP communication link.

The information retrieval agent may record the path of devices that it traversed to locate the storage object. The information retrieval agent may traverse the path back through the devices to update the devices about the retrieved storage object.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a flowchart illustrating one embodiment of a method for facilitating Information Life-cycle Management (ILM). According to the embodiment, agents may be used for information storage and retrieval, policy management, discovery of managed/management devices, other suitable tasks, or any combination of the preceding.

The method begins at step 110, where devices are discovered using discovery agents. The discovery agents may travel from device to device through system 10, retrieve information regarding the devices, and report the devices information to directory server 24. The devices may include clients 20 and management element configured as servers 28. Example discovery agents are described in more detail with reference to FIG. 3.

Figure 3:
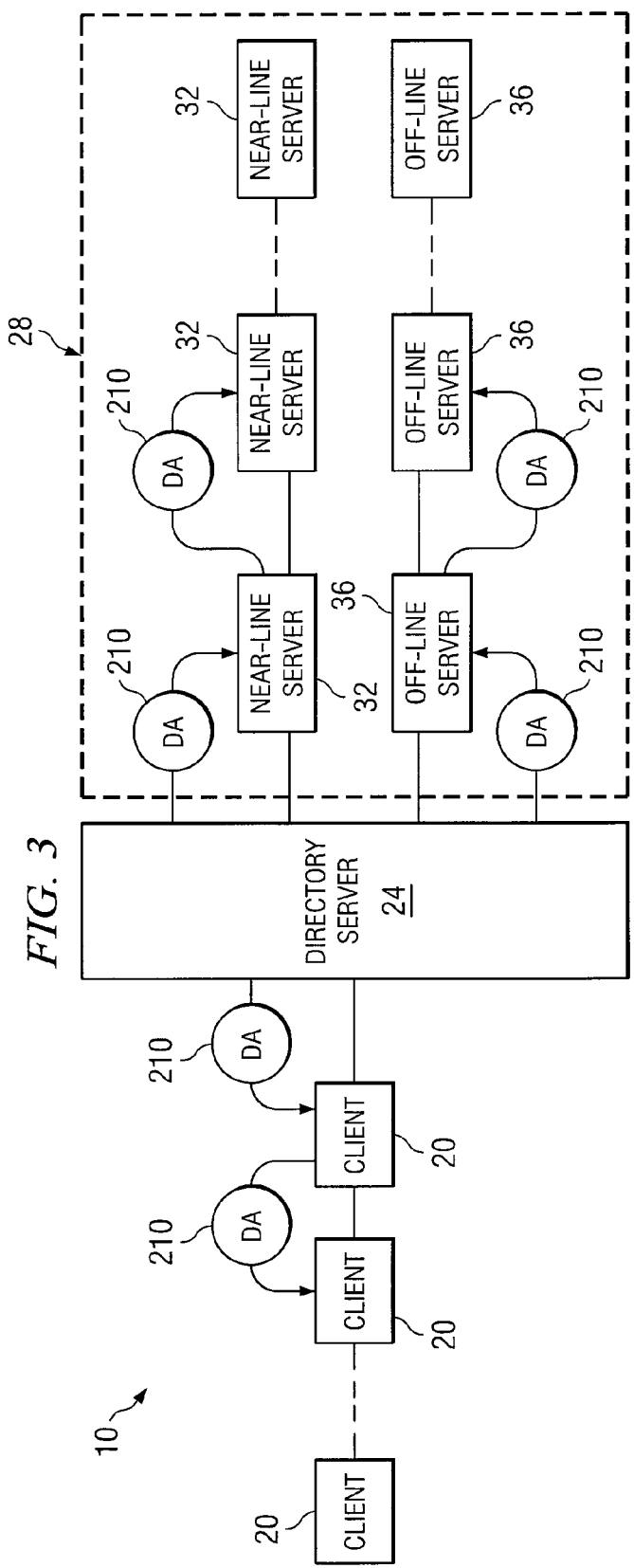
FIG. 3 is a block diagram illustrating example discovery agents.

FIG. 3 is a block diagram illustrating example discovery agents (DAs) 210 traveling from device to device through system 10.

Referring back to FIG. 2, the devices advertise themselves using advertising agents at step 114. The devices may send advertising agents to directory server 24 to update the device information for the devices. The management elements may also send negotiation agents to directory server 24 to negotiate on behalf of the management elements. Example advertising agents and negotiation agents are described in more detail with reference to FIG. 4.

Figure 4:
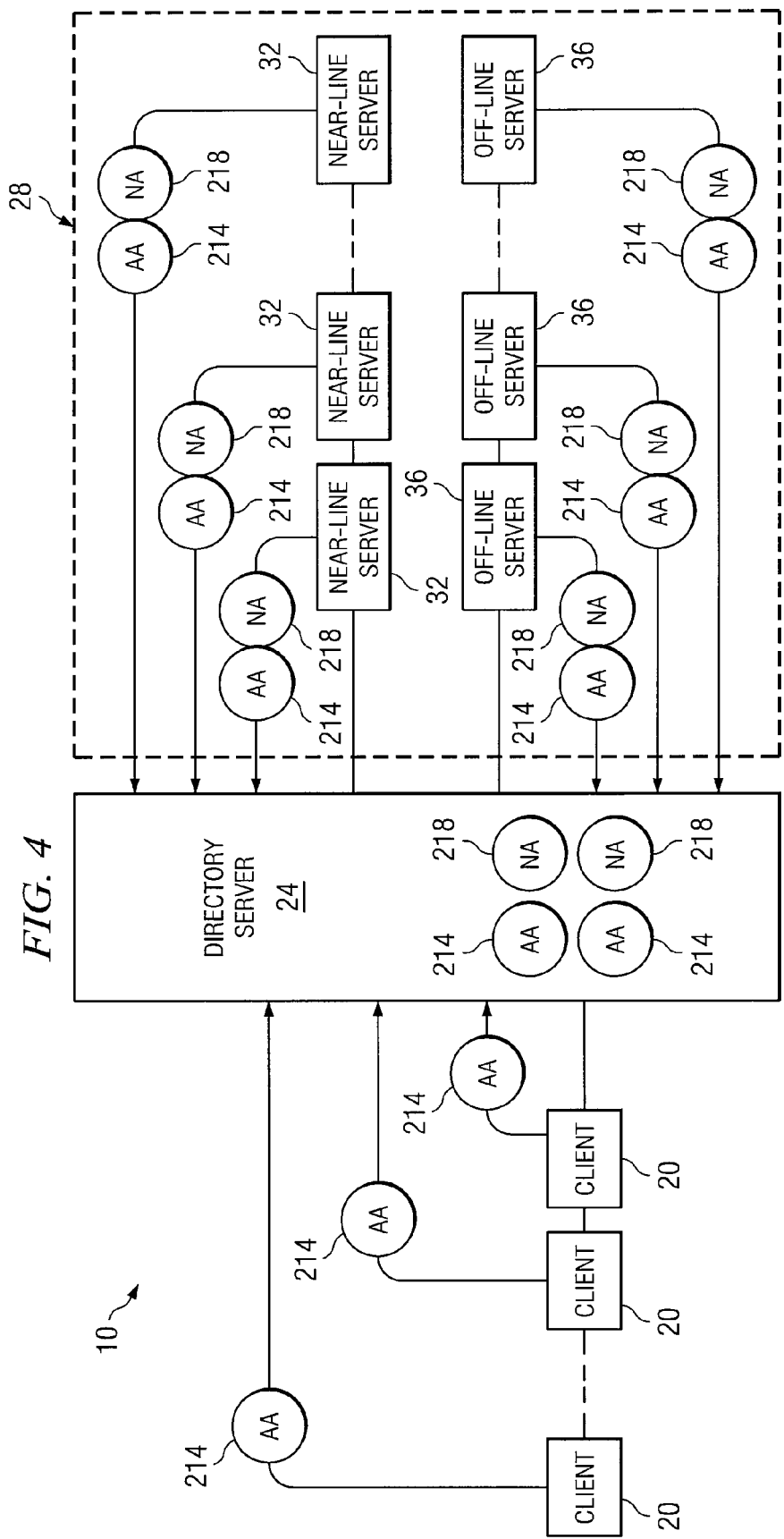
FIG. 4 is a block diagram illustrating example advertising agents and negotiation agents.

FIG. 4 is a block diagram illustrating example advertising agents (AAs) 214 and negotiation agents (NAs) 218 sent to directory server 24. The devices send advertising agents 214, and the management elements send negotiation agents 218 to directory server 24.

Referring back to FIG. 2, storage policies are updated at step 118 using policy agents. Directory server 24 may send policy management agents to management elements to update the policies of the management elements. A management element may generate a policy management client agent to request a policy update.

Storage objects are checked using policy check agents at step 122 to determine if a storage object should be moved. A policy check agent may be run at a management element to establish if storage objects stored at the management element should be moved. Example policy check agents are described in more detail with reference to FIG. 5.

Figure 5:
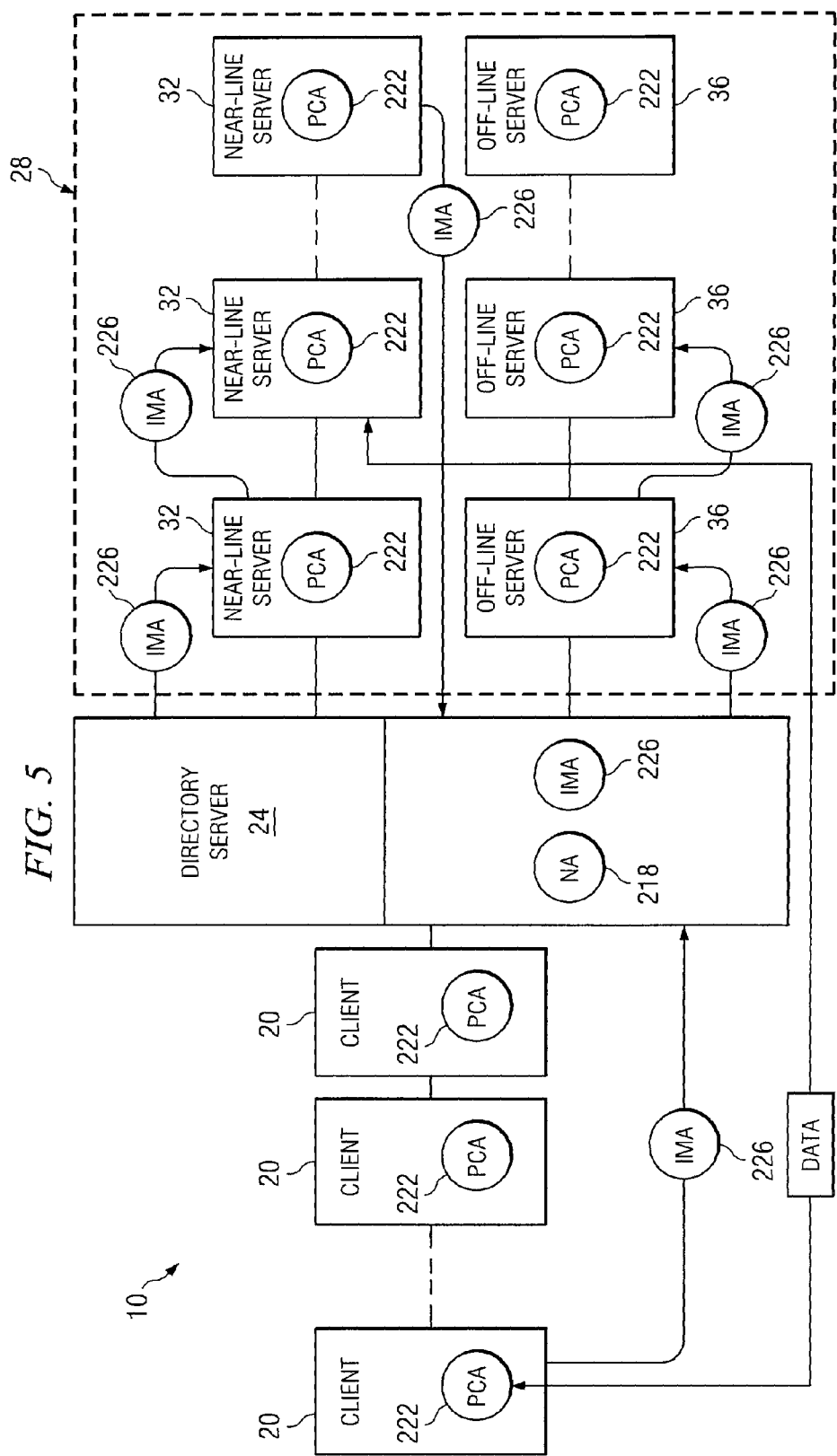
FIG. 5 is a block diagram illustrating example policy check agents and information management agents.

FIG. 5 is a block diagram illustrating example policy check agents (PCAs) 222 at devices of system 10.

Referring back to FIG. 2, a storage object may need to be moved at step 126. If a storage object does not need to be moved, the method returns to step 122, where the storage objects are checked. If a storage object is to be moved at step 126, the method proceeds to step 130.

Requirements for moving the storage object are established by an information movement agent at step 130. Available management elements are identified at step 132 by the information movement agent. The information movement agent may travel to directory server 24 to establish the available management elements. Example information movement agents are described in more detail with reference to FIG. 5.

FIG. 5 is a block diagram illustrating example information movement agents (IMAs) 226 traveling through system 10.

Referring back to FIG. 2, the information movement agent negotiates with negotiation agents of the available management elements 28 at step 134 to select a destination management element. A destination management element is selected from the available management elements at step 138 in accordance with the negotiation.

The storage object is moved to the selected destination management element at step 142. The information movement agent may travel to the selected destination management element and request the storage object from the policy check agent of the source management element.

A storage object is retrieved at step 142 using an information retrieval agent. The storage object may be retrieved in response to a request from a device of system 10. The information retrieval agent may track down the storage object and send the storage object to the requesting device. Example information retrieval agents are described in more detail with reference to FIG. 6.

Figure 6:
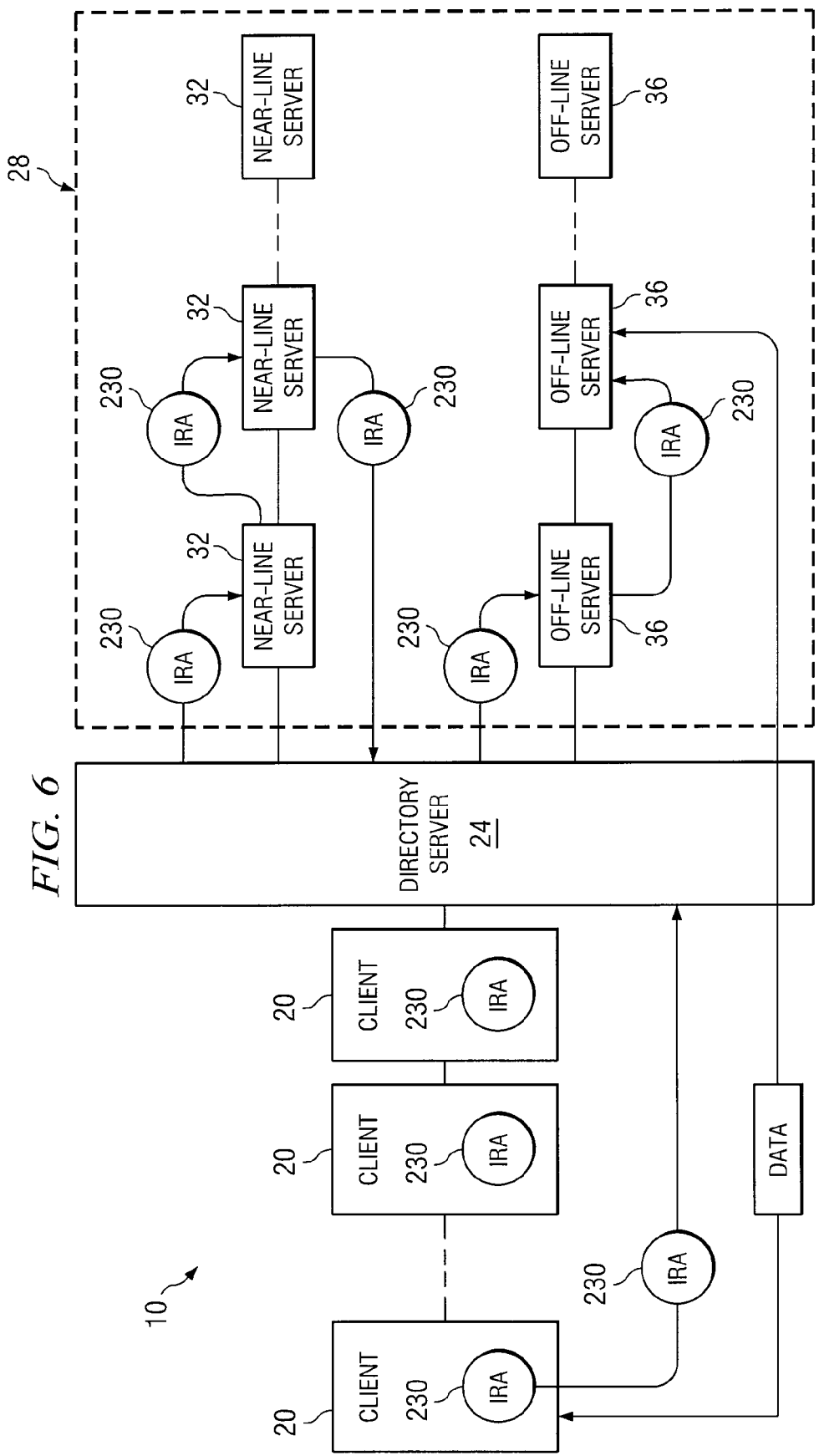
FIG. 6 is a block diagram illustrating example information retrieval agents.

FIG. 6 is a block diagram illustrating example information retrieval agents (IRAs) 230 traveling through system 10.

Referring back to FIG. 2, the method terminates after the storage object is retrieved.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that mobile agents may perform operations of an Information Life-cycle Management (ILM) system. The mobile agents may more efficiently perform the operations.

Another technical advantage of one embodiment may be that mobile agents may be used to discover management elements of an ILM system. Another technical advantage of one embodiment may be that mobile agents may be used to update storage policies of an ILM system. Another technical advantage of one embodiment may be that mobile agents may be used to move storage objects in an ILM system.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method comprising:
facilitating an information life-cycle management system comprising a plurality of devices, the plurality of devices comprising a plurality of management elements organized in a plurality of levels;
generating a mobile agent operable to manage movement of a first storage object, the mobile agent embodied in executable code, the mobile agent operable to automatically move to at least one management element of the plurality of management elements;
establishing, using the mobile agent, one or more requirements for moving the first storage object; and
selecting, using the mobile agent, a destination management element from the plurality of management elements according to the one or more requirements.

2. The method of claim 1, further comprising:
generating a discovery agent at a directory server, the discovery agent operable to perform a discovery operation; and
sending the discovery agent to:
discover at least one device of the plurality of devices; and
gather device information describing the at least one device.

3. The method of claim 1, further comprising:
generating a negotiation agent at a management element of the plurality of management elements; and
sending the negotiation agent to a directory server to negotiate on behalf of the management element.

4. The method of claim 1, further comprising:
generating an advertising agent at a device of the plurality of devices; and
sending the advertising agent to a directory server to update device information describing the device.

5. The method of claim 1, further comprising:
generating a policy agent; and
sending the policy agent to update the storage policy.

6. The method of claim 1, further comprising:
generating a policy check agent; and
sending the policy check agent to a management element of the plurality of management elements to establish whether a storage object of the management element is to be moved.

7. The method of claim 1, further comprising:
generating an information movement agent; and
sending the information movement agent to a management element of the plurality of management elements to manage movement of a storage object of the management element.

8. The method of claim 1, further comprising:
generating an information movement agent;
identifying, using the information movement agent, one or more available management elements of the plurality of management elements; and
negotiating, using the information movement agent, with one or more negotiation agents of the one or more available management elements to select a destination management element from the one or more available management elements.

9. The method of claim 1, further comprising:
generating an information retrieval agent;
locating, using the information retrieval agent, a second storage object; and
sending, using the information retrieval agent, the second storage object to one of the plurality of devices.

10. One or more computer-readable tangible media embodying logic, the logic when executed operable to:
facilitate an information life-cycle management system comprising a plurality of devices, the plurality of devices comprising a plurality of management elements organized in a plurality of levels;
generate a mobile agent operable to manage movement of a first storage object, the mobile agent embodied in executable code, the mobile agent operable to automatically move to at least one management element of the plurality of management elements;
establish, using the mobile agent, one or more requirements for moving the first storage object; and select, using the mobile agent, a destination management element from the plurality of management elements according to the one or more requirements.

11. The computer-readable tangible media of claim 10, wherein the logic is further operable to:
generate a discovery agent at a directory server; and
send the discovery agent to:
discover at least one device of the plurality of devices; and
gather device information describing the at least one device.

12. The computer-readable tangible media of claim 10, wherein the logic is further operable to:
generate a negotiation agent at a management element of the plurality of management elements; and
send the negotiation agent to a directory server to negotiate on behalf of the management element.

13. The computer-readable tangible media of claim 10, wherein the logic is further operable to:
generate an advertising agent at a device of the plurality of devices; and
send the advertising agent to a directory server to update device information describing the device.

14. The computer-readable tangible media of claim 10, wherein the logic is further operable to:
generate a policy agent; and
send the policy agent to update the storage policy.

15. The computer-readable tangible media of claim 10, wherein the logic is further operable to:
generate a policy check agent; and
send the policy check agent to a management element of the plurality of management elements to establish whether a storage object of the management element is to be moved.

16. The computer-readable tangible media of claim 10, wherein the logic is further operable to:
generate an information movement agent; and
send the information movement agent to a management element of the plurality of management elements to manage movement of a storage object of the management element.

17. The computer-readable tangible media of claim 10, wherein the logic is further operable to:
generate an information movement agent;
identify, using the information movement agent, one or more available management elements of the plurality of management elements; and
negotiate, using the information movement agent, with one or more negotiation agents of the one or more available management elements to select a destination management element from the one or more available management elements.

18. The computer-readable tangible media of claim 10, wherein the logic is further operable to:
generate an information retrieval agent; and
locate, using the information retrieval agent, a second storage object; and
send, using the information retrieval agent, the second storage object to one of the plurality of devices.

19. A system for facilitating performance of an operation in an information life-cycle management system comprises:

processor means for facilitating an information life-cycle management system comprising a plurality of devices, the plurality of devices comprising a plurality of management elements organized in a plurality of levels;
processor means for generating a mobile agent operable to manage movement of a storage object, the mobile agent embodied in executable code, the mobile agent operable to automatically move to at least one management element of the plurality of management elements;
processor means for establishing, using the mobile agent, one or more requirements for moving the storage object; and
processor means for selecting, using the mobile agent, a destination management element from the plurality of management elements according to the one or more requirements.

20. A method for facilitating performance of an operation in an information life-cycle management system comprises:
facilitating an information life-cycle management system comprising a plurality of devices, the plurality of devices comprising a plurality of management elements organized in a plurality of levels;
generating a mobile agent operable to manage movement of a storage object, the mobile agent embodied in executable code, the mobile agent operable to move through at least a portion of the information life-cycle management system;
establishing, using the mobile agent, one or more requirements for moving the storage object;
selecting, using the mobile agent, a destination management element from the plurality of management elements according to the one or more requirements;
generating a discovery agent at a directory server;
sending the discovery agent to:
discover at least one device of the plurality of devices; and
gather device information describing the at least one device;
generating a negotiation agent at a first management element of the plurality of management elements;
sending the negotiation agent to a directory server to negotiate on behalf of the first management element;
generating an advertising agent at a first device of the plurality of devices
sending the advertising agent to a directory server to update device information describing the first;
generating a policy agent;
sending the policy agent to update a storage policy;
generating a policy check agent;
sending the policy check agent to a first management element of the plurality of management elements to establish whether a storage object of the first management element is to be moved;
generating an information retrieval agent;
locating, using the information retrieval agent, the storage object; and
sending, using the information retrieval agent, the storage object to the device.

* * * * *